United States Patent [19]
Day et al.

[11] Patent Number: 5,229,881
[45] Date of Patent: Jul. 20, 1993

[54] LOW TRANSMISSION LOW EMISSIVITY GLASS WINDOW AND METHOD OF MANUFACTURE

[75] Inventors: James E. Day, Lawrenceville; Timothy House, Gainesville; Roger Buckley, Hoschton, all of Ga.

[73] Assignee: Tempglass Eastern, Inc., Buford, Ga.

[21] Appl. No.: 896,325

[22] Filed: Jun. 10, 1992

[51] Int. Cl.$^5$ .................. G02B 5/28; C23C 14/34; B32B 17/06
[52] U.S. Cl. .................. 359/360; 204/192.27; 359/585; 428/432; 428/632
[58] Field of Search .................. 359/359, 360, 585; 204/192.27; 428/432, 632

[56] References Cited

U.S. PATENT DOCUMENTS

| | | |
|---|---|---|
| 4,098,956 | 4/1978 | Blickensderfer et al. |
| 4,180,954 | 1/1980 | Gell, Jr. |
| 4,462,883 | 7/1984 | Hart |
| 4,497,700 | 2/1985 | Groth et al. |
| 4,515,151 | 5/1985 | Slemmons et al. |
| 4,548,691 | 10/1985 | Dietrich et al. |
| 4,610,771 | 9/1986 | Gillery |
| 4,773,717 | 9/1988 | Pai et al. |
| 4,790,922 | 12/1988 | Huffer |
| 4,799,745 | 1/1989 | Meyer et al. |
| 4,898,789 | 2/1990 | Finley |
| 4,902,081 | 2/1990 | Huffer |
| 4,902,580 | 2/1990 | Gillery |
| 4,960,645 | 10/1990 | Lingle et al. .................. 359/360 |
| 4,965,121 | 10/1990 | Young et al. |
| 5,059,295 | 10/1991 | Finley |
| 5,085,926 | 4/1992 | Iida et al. |

Primary Examiner—Martin Lerner
Attorney, Agent, or Firm—Dinnin & Dunn

[57] ABSTRACT

A low emissivity, low shading coefficient window consisting of two panes of glass. The first pane having a low wave infrared reflecting and a visible light and shortwave infrared absorbing section of coatings on its inside surface. A second pane spaced about one half inch from the inside surface of the first pane to protect the coatings on the first pane and to insulate the coating. The infrared reflecting section consists of six layers of metals and metal oxides with the stainless steel being used for the absorption of the visible light and shortwave. The first layer consists of a metal oxide selected from the group consisting of tin oxide, zinc oxide, or a combination of zinc and tin oxide. The second layer is of silver or sterling silver. The third layer is stainless steel. The fourth layer is a barrier metal consisting of aluminum titanium, zinc, tin, nickel, chrome or its alloy. The fifth layer is selected from the same group as the first layer. The sixth layer is of titanium oxide.

9 Claims, 1 Drawing Sheet

LOW TRANSMISSION LOW EMISSIVITY GLASS WINDOW AND METHOD OF MANUFACTURE

BACKGROUND OF THE INVENTION

Over the last several years, low emissivity windows which allow shorwave energy to be transmitted through glass but which reflect long wave (infrared energy) have become very popular in the construction of new buildings. These windows are attractive and can be economically efficient if they are constructed to save a significant amount of money on heating and cooling costs. Due to the reflection of the long wave infrared energy on the outside of the window in the summer season radiant heat cannot get into the building, therefore the window helps to keep cooling costs at a lower level. In the winter season, due to the reflection of the infrared energy on the inside of the window, heat cannot escape as easily and therefore the window can assist in keeping the winter heating costs at a lower level. These low emissivity windows are also efficient for keeping out long wave infrared radiation, however they transmit a relatively high percentage of visible light and solar shortwave infrared radiation, which also can act to heat up a room in the summer season thus increasing cooling costs.

The state of the art is shown by the following cited references:

| U.S. Pat. No. | Name | Date |
| --- | --- | --- |
| 4,098,956 | Blickensderfer et al | 1978 |
| 4,180,954 | Gell, Jr. | 1980 |
| 4,462,883 | Hart | 1984 |
| 4,497,700 | Groth et al | 1985 |
| 4,515,151 | Slemmons et al | 1985 |
| 4,548,691 | Dietrich et al | 1985 |
| 4,610,771 | Gillery | 1986 |
| 4,902,580 | Gillery | 1990 |
| 4,902,081 | Huffer | 1990 |
| 4,790,922 | Huffer | 1988 |
| 4,799,745 | Meyer et al | 1989 |
| 4,773,717 | Pai et al | 1988 |
| 4,898,789 | Finley | 1990 |
| 5,059,295 | Finley | 1991 |
| 4,965,121 | Young et al | 1990 |
| 5,085,926 | Iida et al | 1992 |

The disclosures of the above references are hereby incorporated herein by reference.

In the past there have been significant problems in attempting to produce low emissivity low transmission coatings for such glass windows using materials that are readily available. In addition, in the past, there have been significant problems in attempting to produce such low emissivity windows which also provide a low shading coefficient.

Accordingly one object of the present invention is to produce a new low emissivity low shading coefficient glass window.

Another object of the present invention is to provide a new heat reflecting low emissivity window which assists in reducing the heating and air conditioning costs for buildings utilizing such windows.

Another object of the present invention is to provide a new method of manufacturing low emissivity windows.

Other objects, features and advantages of the present invention will become apparent from the subsequent description and the appended claims taken in conjunction with the accompanying drawing.

SUMMARY OF THE INVENTION

Figure 1:
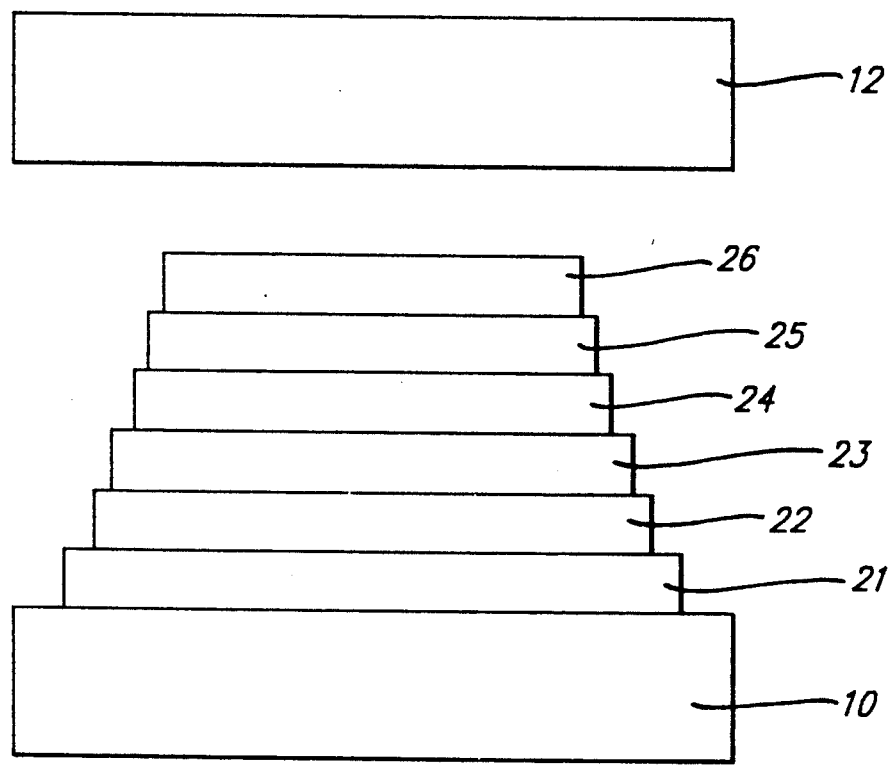
FIG. 1 is a cross-section view, not to scale, showing the layers of materials on the inside surface of a glass pane substrate which is spaced relative to a second glass pane.

The invention disclosed herein is a low emissivity window with the addition of a layer of stainless steel sputter deposited between the silver heat reflecting layer and the titanium barrier layer. The stainless steel layer absorbs a large portion of the visible light radiation and shortwave infrared radiation incident on it, and changes the energy of the visible light and shortwave infrared radiation into long wave heat. It then transmits the long wave heat energy by conducting the heat through the low emissivity window's metallic layers to the window itself, which becomes hot. The heat energy is then conducted and radiated away from the window surface.

DESCRIPTION OF PREFERRED EMBODIMENTS

FIG. 1 shows a window having two panes of glass 10, 12 with a space in between. The glass pane 10 is the outside pane, and it has on its interior or inside surface a sequence of sputter deposited layers. Layer 21 is a layer of a metal oxide selected from the group consisting of tin oxide, zinc oxide, or a combination of zinc and tin oxide. Layer 22 is a layer of silver (and by the term silver it is also meant sterling silver). Layer 23 is a layer of stainless steel. Layer 24 is a layer selected from the group consisting of aluminum, titanium, zinc, tin, nickel, chromium or alloys thereof. Layer 25 is a layer of a metal oxide also selected from the group consisting of tin oxide, zinc oxide, or a combination of zinc and tin oxide. Layer 26 is a layer of titanium oxide. Under preferred circumstances layer 21 would be formed of zinc oxide, layer 24 would be formed of titanium, and layer 25 would be formed of zinc oxide.

As to the distance of separation between the two glass panes, broadly stated, the two panes of glass 10, 12 are separated from one another by a distance of about ⅛ inch to about ⅝ inch, and under more preferred conditions the distance of separation would be approximately ½ inch.

The thickness of the sputtered deposited layers should, broadly stated, be as follow: Layer 21 should be within the range of about 400 to about 800 angstroms. Layer 22 should be within the range of approximately 20 to about 100 angstroms. Layer 23 should be within the range of about 50 to about 100 angstroms. Layer 24 should be within the range of about 20 to about 100 angstroms. Layer 25 should be within the range of about 500 to about 1000 angstroms. Layer 26 should be within the range of about 400 to about 800 angstroms. Under more preferred conditions, layer 21 should be within the range of about 450 to 500 angstroms. Layer 22 should be within the range of about 40 to about 60 angstroms. Layer 23 should be within the range of about 100 to about 200 angstroms. Layer 24 should be within the range of about 60 to about 80 angstroms. Layer 25 should be within the range of about 500 to about 800 angstroms. Layer 26 should be within the range of about 400 to about 600 angstroms.

Each one of the layers 21, 22, 23, 24, 25, and 26 is sputtered deposited, for example, by use of an in-line sputter deposition coating apparatus. Apparatuses of this type are available from the Airco Company or other manufacturers. Typically, such an Airco sputter deposition coating line can be used to sputter deposit the metal layers referred to above on glass panes up to a size of 100 inches by 144 inches or larger. The layers are applied by what is known as vacuum deposition or physical vapor deposition using the Airco sputter deposition coating line.

It is also possible to refer to the approximate thickness of the applied layers 21-26 by reference to the percent transmission through the glass pane 10 at each sequence of application of the applied layers 21, 22, 23, 24, 25, and 26. In this respect it can be stated that after layer 21 is applied, broadly stated, the percent of light transmission would be within the range of approximately 75%-85% and preferably in the range of approximately 80%-82%. After the subsequent layers 22, 23, and 24 are applied, broadly stated, the percent transmission of light should be within the range of approximately 15%-50%; and preferably within the range of approximately 40%-45%. Layers 25 and 26 are sometimes referred to as a de-reflecting layers. After application of layer 25 the percent transmission of light, broadly stated, should be within the range of approximately 17%-52%; and preferably within the range of approximately 43%-47%. After application of layer 26 the percent transmission of light should be, broadly stated, within the range of approximately 15%-60%; and preferably within the range of approximately 48%-50%.

While it will be apparent that the preferred embodiments of the invention disclosed are well calculated to fulfill the objects, benefits, and advantages of the invention, it will be appreciated that the invention is susceptible to modification, variation and change without departing from the proper scope or fair meaning of the subjoined claims.

What is claimed is:

1. A low transmission low emissivity window comprising at least two panes of glass, wherein a first pane of said glass has a sputter deposited multilayer coating on its inside surface comprised of:
   (a) a layer of a metal oxide selected from the group consisting of tin oxide, zinc oxide, or a combination of zinc and tin oxide,
   (b) a layer of silver,
   (c) a layer of stainless steel,
   (d) a layer selected from the group consisting of aluminum, titanium, zinc, tin, nickel, chromium, or alloys thereof,
   (e) a layer of a metal oxide selected from the group consisting of tin oxide, zinc oxide, or a combination of zinc and tin oxide,
   (f) a layer of titanium oxide, and wherein,
   said two panes of glass are separated from one another by a distance of about ⅛ inch to about ⅞ inch.

2. A low transmission low emissivity window comprising at least two panes of glass, wherein a first pane of said glass has a sputter deposited multilayer coating on its inside surface comprised of:
   (a) a layer of a metal oxide selected from the group consisting of tin oxide, zinc oxide, or a combination of zinc and tin oxide,
   (b) a layer of silver,
   (c) a layer of stainless steel,
   (d) a layer selected from the group consisting of aluminum, titanium, zinc, tin, nickel, chromium, or alloys thereof,
   (e) a layer of a metal oxide selected from the group consisting of tin oxide, zinc oxide, or a combination of zinc and tin oxide,
   (f) a layer of titanium oxide, and wherein,
   said layer (a) is deposited at a thickness between about 400 to about 800 angstroms,
   said layer (b) is deposited at a thickness between about 20 to about 800 angstroms,
   said layer (c) is deposited at a thickness between about 50 to about 1000 angstroms,
   said layer (d) is deposited at a thickness between about 20 to about 100 angstroms,
   said layer (e) is deposited at a thickness between about 500 to about 1000 angstroms,
   said layer (f) is deposited at a thickness between about 400 to about 800 angstroms.

3. The product according to claim 2 wherein,
   said layer (a) is zinc oxide,
   said layer (d) is titanium, and
   said layer (e) is zinc oxide.

4. The product according to claim 3 wherein,
   said two panes of glass are separated from one another by a distance of about ½ inch.

5. The product according to claim 3 wherein,
   said two panes of glass are separated from one another by a distance of about ⅛ inch to about ⅞ inch.

6. The product according to claim 2 wherein,
   said two panes of glass are separated from one another by a distance of about ½ inch.

7. The product according to claim 2 wherein,
   said two panes of glass are separated from one another by a distance of about ⅛ inch to about ⅞ inch.

8. A method of making a low emissivity window comprising the steps of:
   (a) sputtering a layer of a metal oxide selected from the group consisting of tin oxide, zinc oxide, or a combination of zinc and tin oxide, onto a glass substrate,
   (b) sputtering on a layer of silver,
   (c) sputtering on a layer of stainless steel,
   (d) sputtering on a layer of selected from the group consisting of aluminum, titanium, zinc, tin, nickel, chromium, or alloys thereof,
   (e) sputtering on a layer of a metal oxide selected from the group consisting of tin oxide, zinc oxide, or a combination of zinc and tin oxide,
   (f) sputtering on a layer of titanium oxide, further characterized in that, said layer (a) is deposited at a thickness between about 400 to about 800 angstroms,
   said layer (b) is deposited at a thickness between about 20 to about 800 angstroms,
   said layer (c) is deposited at a thickness between about 50 to about 1000 angstroms,
   said layer (d) is deposited at a thickness between about 20 to about 100 angstroms,
   said layer (e) is deposited at a thickness between about 500 to about 1000 angstroms,
   said layer (f) is deposited at a thickness between about 400 to about 800 angstroms.

9. The method of claim 8 further characterized in that,
   said layer (a) is zinc oxide,
   said layer (d) is titanium, and
   said layer (e) is zinc oxide.

* * * * *

UNITED STATES PATENT AND TRADEMARK OFFICE
CERTIFICATE OF CORRECTION

PATENT NO. : 5,229,881
DATED : July 20, 1993
INVENTOR(S) : James E. Day, et. al.

It is certified that error appears in the above-indentified patent and that said Letters Patent is hereby corrected as shown below:

Column 1, line 8, "shorwave" should read --shortwave--.
Column 4, line 31, claim 6, "1/8" should read --1/2--.

Signed and Sealed this

Seventh Day of June, 1994

Attest:

BRUCE LEHMAN

Attesting Officer

Commissioner of Patents and Trademarks